United States Patent
Nepper et al.

(10) Patent No.: US 8,926,728 B2
(45) Date of Patent: Jan. 6, 2015

(54) PROCESS AND PLANT FOR PRODUCING HOT METAL

(75) Inventors: Jean-Paul Nepper, Friedrichsdorf (DE); Tobias Stefan, Frankfurt am Main (DE)

(73) Assignee: Outotec Oyj, Espoo (FI)

( * ) Notice: Subject to any disclaimer, the term of this patent is extended or adjusted under 35 U.S.C. 154(b) by 128 days.

(21) Appl. No.: 13/700,745

(22) PCT Filed: May 19, 2011

(86) PCT No.: PCT/EP2011/002498
§ 371 (c)(1), (2), (4) Date: Nov. 29, 2012

(87) PCT Pub. No.: WO2011/151020
PCT Pub. Date: Dec. 8, 2011

(65) Prior Publication Data
US 2013/0118306 A1 May 16, 2013

(30) Foreign Application Priority Data
Jun. 4, 2010 (DE) .......................... 10 2010 022 773

(51) Int. Cl.
*C21B 11/00* (2006.01)
*F27D 17/00* (2006.01)
*C21B 13/00* (2006.01)
*C21B 13/14* (2006.01)
*C21C 5/52* (2006.01)

(52) U.S. Cl.
CPC ............. *C21B 11/00* (2013.01); *C21B 13/0033* (2013.01); *C21B 13/004* (2013.01); *C21B 13/0073* (2013.01); *C21B 13/0086* (2013.01); *C21B 13/143* (2013.01); *C21C 5/527* (2013.01); *F27D 17/001* (2013.01); *C21B 2100/02* (2013.01); *C21B 2100/04* (2013.01); *C21B 2100/06* (2013.01); *C21C 2100/06* (2013.01)
USPC ............... 75/446; 75/448; 266/155; 266/156; 266/172

(58) Field of Classification Search
CPC C22B 13/143; C22B 13/0033; C22B 13/004; C22B 13/0073; C22B 13/0086; C22B 11/00; C22B 2100/04; C22B 2100/06
USPC ..................................... 75/446, 448
See application file for complete search history.

(56) References Cited

U.S. PATENT DOCUMENTS 2,692,050 A * 10/1954 Nelson ......................... 423/148
4,073,642 A 2/1978 Collin et al.
(Continued)

FOREIGN PATENT DOCUMENTS

DE  10 2004 053 676 A1  5/2006
EP       0 614 990 A1    9/1994
(Continued)

*Primary Examiner* — George Wyszomierski
*Assistant Examiner* — Tima M McGuthry Banks
(74) *Attorney, Agent, or Firm* — Leydig, Voit & Mayer, Ltd.

(57) ABSTRACT

A process for producing hot metal includes partially reducing granular raw materials containing iron oxide with a carbonaceous reducing agent in a fluidized bed reactor at a temperature of at least 850° C. so as to obtain a reduced mixture. The reduced mixture is cooled to between 600° C. and 800° C. in a heat exchanger apparatus using a preheated process gas as a cooling medium that is preheated to between 300° C. and 500° C. before being introduced into the heat exchanger apparatus. The reduced mixture is then supplied to a smelting reduction unit via a discharge system.

15 Claims, 3 Drawing Sheets

(56) References Cited

U.S. PATENT DOCUMENTS

| | | | |
|---|---|---|---|
| 4,094,665 A | * | 6/1978 | Collin et al. ............... 75/10.37 |
| 5,183,495 A | * | 2/1993 | Ariyama et al. ............... 75/379 |
| 5,433,767 A | * | 7/1995 | Bresser et al. ............... 75/446 |

FOREIGN PATENT DOCUMENTS

| | | | | |
|---|---|---|---|---|
| EP | 2 151 591 A1 | 2/2010 | | |
| GB | 976934 A | * | 12/1964 | |
| GB | 1506170 | * | 4/1978 | ......... C21B 13/0033 |
| WO | WO 02 810 74 A1 | 3/2002 | | |
| WO | WO 2004 056 462 A1 | 12/2003 | | |
| WO | WO 2004057040 A1 | 7/2004 | | |
| WO | WO 2005 116 273 A1 | 5/2005 | | |
| WO | WO 2005 116 275 A2 | 5/2005 | | |
| WO | WO 2006 048 283 A1 | 5/2006 | | |
| WO | WO 2008142197 A1 | 11/2008 | | |
| WO | WO 2009006958 A1 | 1/2009 | | |

\* cited by examiner

PROCESS AND PLANT FOR PRODUCING HOT METAL

CROSS-REFERENCE TO PRIOR APPLICATIONS

This application is a U.S. National Phase application under 35 U.S.C. §371 of International Application No. PCT/EP2011/002498, filed on May 19, 2011, and claims benefit to German Patent Application No. DE 10 2010 022 773.0, filed on Jun. 4, 2010. The International Application was published in English on Dec. 8, 2011 as WO 2011/151020 under PCT Article 21(2).

FIELD

The present invention relates to the production of hot metal, in which a reduced ore is used as intermediate product.

BACKGROUND

The recovery of hot metal from fine raw materials containing iron oxide, e.g. iron ores, is mainly effected by agglomeration (sintering, pelletizing) followed by smelting reduction (e.g. in a blast furnace). Agglomeration can be avoided by pre-reduction of the fine raw materials to reduced ore and by subsequent smelting of this reduced ore to hot metal. For example, the applicant has developed the so-called "Circofer" process, in which iron ore in the solid state is directly reduced together with coal at e.g. 850-950° C. and a pressure of e.g. 4 bar to obtain sponge iron (cf. WO 2005/116275 A, WO 2005/116273 A). The product of the direct reduction usually is separated by magnetic separation into a non-magnetic fraction of by-products in particular of the coal and a magnetic fraction containing iron. The iron-containing magnetic fraction, i.e. the reduced ore, as intermediate product is then processed further in smelting reduction processes, for example by the so-called "Auslron" process of the applicant or in a submerged arc furnace, to obtain hot metal.

Before the (hot) magnetic separation, the reduced mixture of reduced ore on the one hand and coal ash and residual carbon (char) on the other hand, which is withdrawn from the direct reduction as intermediate product, must at least be cooled to below the Curie temperature of iron of 768° C., in order to achieve an efficient separation of the non-magnetic by-products before smelting. So far, only few concepts are available for cooling the reduced mixture. For example, an indirect cooling by water is proposed. In this case, however, a considerable part of the thermal energy of the reduced mixture from the direct reduction is lost. In accordance with U.S. Pat. No. 4,073,642 the intermediate product is indirectly cooled with air in a classical fluidized bed. In this case, too, a considerable part of the thermal energy is lost, since the air used for cooling cannot be recirculated to the "Circofer" process. Many other publications propose no cooling concept at all.

In the direct reduction of iron ore by the "Circofer" process a reducing fluidizing gas with high temperature is supplied to the fluidized bed for direct reduction. When using greatly carburizing atmospheres (atmospheres with a high CO content) in a temperature range between 450° C. and 800° C., there is a risk of high-temperature corrosion of the plant materials by so-called "metal dusting". The appearance of this type of damage is not uniform and reaches from general attack to pitting attack. The corrosion product substantially consists of graphite and fine metal particles. "Metal dusting" can lead to a quick material failure of the plant materials. To avoid such high-temperature corrosion, expensive high-alloy steels with high contents of nickel, chromium, aluminum and/or silicon must be used for all components which are in contact with the hot fluidizing gas, such as in particular the gas heater.

The disadvantages of the above-described technology hence consist in considerable energy losses due to the cooling of the iron-containing intermediate products and in the high costs for the gas heater materials to be used.

SUMMARY

In an embodiment, the present invention provides a process for producing hot metal. Granular raw materials containing iron oxide are partially reduced with a carbonaceous reducing agent in a fluidized bed reactor at a temperature of at least 850° C. so as to obtain a reduced mixture. The reduced mixture is cooled to between 600° C. and 800° C. in a heat exchanger apparatus using a preheated process gas as a cooling medium that is preheated to between 300° C. and 500° C. before being introduced into the heat exchanger apparatus. The reduced mixture is then supplied to a smelting reduction unit via a discharge system.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention overcomes the disadvantages of the prior art and provides a process and a plant for the energy-optimized production of hot metal.

In the process of an embodiment of the invention for producing hot metal, in which granular iron ore is partially reduced with a reducing agent in a fluidized bed reactor at a temperature of at least 850° C. and in particular the magnetic part of the reduced mixture is molten to hot metal in a smelting reduction unit, the reduced mixture is cooled to 700° C. to 800° C., preferably to 740° C. to 760° C. in a heat exchanger apparatus, before being supplied to the smelting reduction unit, wherein a preheated process gas is used as cooling medium.

Surprisingly, it could be found in accordance with the present invention that the energy demand for the recovery of hot metal can be lowered distinctly when after merely slightly cooling in the heat exchanger apparatus, the reduced mixture from the pre-reduction is supplied to a hot magnetic separator in which non-magnetic fractions are separated prior to smelting. The reduced ore obtained in the hot magnetic separator still has a sufficiently high temperature of 650° C. to 750° C., so that the energy expenditure for the subsequent smelt reduction can be reduced distinctly.

Since in addition a circulating fluidized bed preferably is used for the pre-reduction, a uniform reduction of the used material under a minimum energy expenditure can be achieved due to the high mass and heat transfer in the fluidized bed.

To achieve a particularly efficient procedure, it is proposed to circulate the process gas. In accordance with a preferred embodiment, the process gas therefore is a recirculation gas preferably containing carbon monoxide (CO) and elementary hydrogen ($H_2$), which has been withdrawn from the reduction reactor, dedusted, cooled and largely liberated from the reduction products water vapor ($H_2O$) and carbon dioxide ($CO_2$).

Preferably, the process gas is preheated to 300° C. to 500° C., preferably to 350° C. to 450° C., and in particular to 390° C. to 410° C.

By moderately preheating the process gas to temperatures which lie below the critical temperature range for high-temperature corrosion, carburization of the plant materials ("metal dusting") can be prevented even without using expensive high-alloy steels for the process gas heater.

In accordance with an embodiment of the invention, the process gas is heated by the reduced mixture in the heat exchanger apparatus to 700° C. to 800° C., preferably to 740° C. to 760° C.

Figure 3:
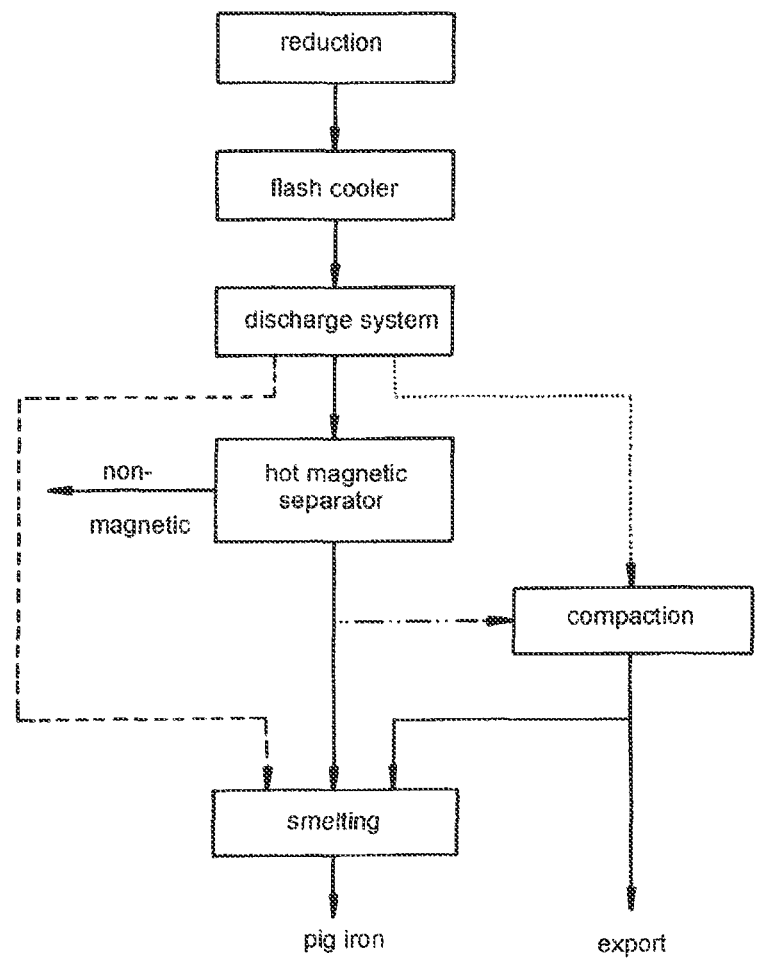

In accordance with a development of the process, the reduced mixture is separated from the heated process gas subsequent to the heat exchanger apparatus, the heated process gas is supplied to the fluidized bed reactor as fluidizing gas through a recycling duct, and after decreasing the excess pressure of the reduction stage the solids are supplied through a discharge system developed by the applicant (cf. WO 02/081074 A1) to the hot magnetic separator (preferred embodiment in FIG. 3), directly to the smelting reduction unit (special case 1 in FIG. 3), or to a compaction unit (special case 2 in FIG. 3).

This development of an embodiment of the invention involves the advantage that on the one hand the reduced mixture is cooled by the preheated process gas to a temperature below the Curie temperature of the iron, so that an efficient hot magnetic separation becomes possible, and on the other hand the thermal energy absorbed by the preheated process gas is again provided to the reduction reactions in the fluidized bed reactor. Consequently, no thermal energy is lost by the procedure in accordance with an embodiment of the invention, and the thermal energy generated and present in the system is utilized more efficiently.

In addition, it was found to be advantageous to deliver the reduced mixture in the heat exchanger apparatus to the height required for supply to the discharge system, wherein the height of the discharge system is also determined by the succeeding apparatuses such as hot magnetic separator, compaction unit and/or smelting unit. By utilizing the dynamics of the heat exchanger apparatus for delivering the reduced mixture, a separate process step for transporting the iron-containing solids to the required height can be omitted.

In a simple manner, the procedure also provides for adjusting the flow temperature at the hot magnetic separator to a value below the Curie temperature by adjusting the temperature of the process gas at the gas heater in correspondence with the temperature of the reduced mixture leaving the fluidized bed reactor. Hence, more expensive process steps can be omitted.

In accordance with a preferred embodiment of the invention the plant pressure, which exists in the fluidized bed reactor and the heat exchanger apparatus, is decreased completely in a discharge system provided subsequent to the heat exchanger apparatus via a rising conduit and a receiving vessel.

When smelting reduction does not tolerate fine material in the feed, e.g. because of excessive dust losses, or when decoupling of the process stages is desired for safety or geographical reasons, the reduced mixture can be supplied to a hot compaction or hot briquetting unit after the discharge system (special case 2 in FIG. 3) or the hot reduced ore can be supplied to a hot compaction or hot briquetting unit after the hot magnetic separation (special case 3 in FIG. 3), in accordance with an embodiment of the invention.

A plant for producing hot metal in accordance with an embodiment of the invention, which is suitable in particular for performing the process described above, includes charging apparatuses for iron ore and reducing agent, a fluidized bed reactor for the partial reduction of iron ore, possibly a hot magnetic separator, possibly a compaction unit and a smelting reduction furnace. The plant is characterized in that between the fluidized bed reactor and the smelting unit or the hot magnetic separator or the compaction unit a heat exchanger apparatus is provided, to which the reduced mixture from the fluidized bed reactor is supplied, that the heat exchanger apparatus is connected with a duct for preheated process gas and that the heat exchanger apparatus is connected with the hot magnetic separator, the compaction unit or directly with the smelting reduction unit via a discharge system.

In the plant in accordance with an embodiment of the invention it has surprisingly been found that by providing the heat exchanger apparatus further cooling stages and hence a more complex plant configuration can be omitted. As described above, the reduced mixture produced in the plant nevertheless can be cooled to below the Curie temperature necessary for the hot magnetic separator, without causing a significant loss of thermal energy.

In accordance with a particularly preferred embodiment, the heat exchanger apparatus is a flash cooler which preferably includes an annular fluidized bed. Flash cooler in the sense of the present invention is understood to be an apparatus into which on the one hand a hot medium to be cooled is introduced and into which on the other hand a cooling medium flows, whose adjusted velocity contributes to an intensive intermixing of the two media. With the flash cooler in the sense of the present invention, the reduced mixture consequently can be intermixed with the process gas used as coolant very quickly and efficiently. The high velocity in the flash cooler in addition contributes to the fact that the reduced mixture is delivered to the height of the outlet.

In accordance with an embodiment of the invention it is proposed that subsequent to the heat exchanger apparatus a cyclone is provided for separating the reduced mixture from the preheated process gas, that the recycling duct for preheated process gas leads out of the cyclone into the fluidized bed reactor, and that the solids chute leads out of the cyclone into the discharge system before the hot magnetic separator, the compaction unit or the smelting unit.

After intensively intermixing the reduced mixture and the preheated process gas in the heat exchanger apparatus, the cooled reduced mixture is separated from the conveying gas in the cyclone and supplied to the discharge system. Instead of the cyclone other suitable separating means can of course also be used. The heated process gas separated in the cyclone is supplied to the fluidized bed reactor through the recycling duct, preferably via a central nozzle, so that its thermal energy is available for the reduction.

In accordance with a particular embodiment of the present invention, the discharge system consists of a buffer hopper under plant pressure which includes a downcomer that leads into the sending vessel. From there, the reduced mixture is delivered upwards by an inert carrier gas via a riser and after an overflow hopper supplied to the distribution hopper via an inclined chute. With this discharge system a continuous transport of the hot, fine-grain reduced mixture is possible, while at the same time completely decreasing the excess plant pressure along the length of the riser.

Figure 1:
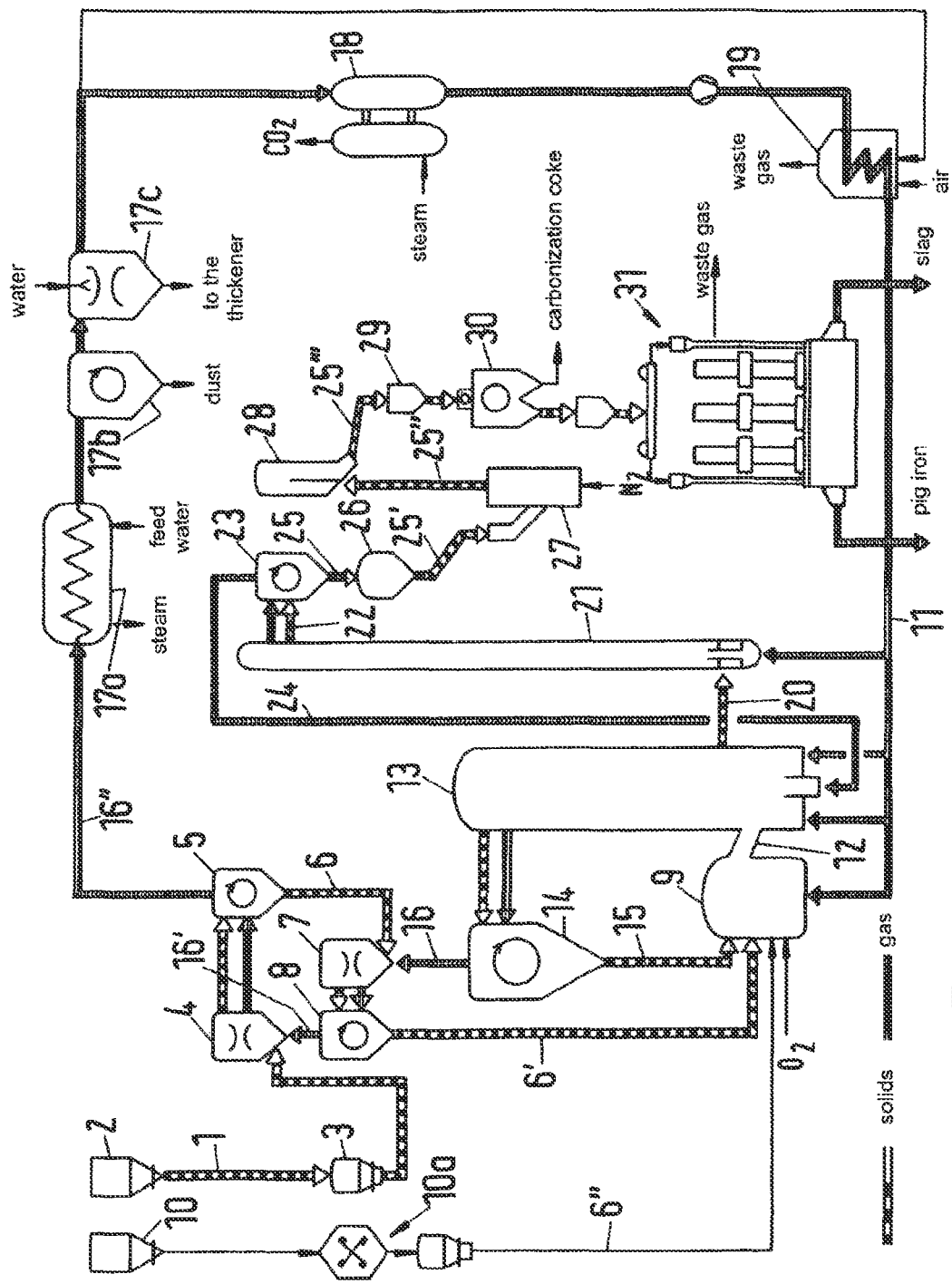
FIG. 1 shows a process diagram of a process and a plant in accordance with a preferred embodiment of the present invention.

In the plant for producing hot metal as shown in FIG. 1, granular iron ore is continuously withdrawn from a storage bin 2 via a solids supply chute 1, optionally mixed with a further medium in a mixing tank 3 and charged into a suspension heat exchanger 4 of a first preheating stage, in which the material preferably is suspended and preheated by the waste gas withdrawn from a second preheating stage. Subsequently, the granular iron ore is delivered by the gas stream into a cyclone 5 in which the solids are separated from the gas. The separated solids are delivered through a solids chute 6 into a second, e.g. Venturi-type suspension heat exchanger 7, where they are heated further up to a temperature of about 800° C. and again separated from the gas stream in a downstream cyclone 8.

The ore thus preheated is delivered through a solids chute 6' into a reactor 9, for example a heat generator. From the storage bin 10, a reducing agent, e.g. in the form of coal with a grain size of e.g. less than 5 mm, as well as oxygen is additionally supplied to the heat generator 9 via a solids conduit 6". Optionally, an apparatus (grinder) 10a for crushing and drying the coal can be provided downstream of the storage bin 10.

The solids supply chute 1, the storage tanks 2, 10, the mixing tank 3, the apparatus 10a and the solids conduits 6', 6" form the charging devices.

Furthermore, a process gas, in particular a recirculation gas consisting of CO/H$_2$, is supplied to the heat generator 9 via a gas duct 11 as fluidizing gas with a temperature of 300° C. to 500° C., preferably about 400° C., which fluidizes the solids in the heat generator 9 by forming a fluidized bed.

The heated solids-gas mixture is continuously supplied from the heat generator 9 via a connecting passage 12 into a reactor 13 for partial reduction, in which the solids are fluidized by the fluidizing gas supplied via the gas conduit 11 by forming a circulating fluidized bed, and the granular iron ore is reduced by the reducing agent, in particular by the carbon monoxide, up to a degree of metallization, based on its iron content, of at least 50%, preferably about 70%.

As reducing agent for the partial reduction of the iron ore all substances known to the skilled person for this purpose can be used in principle, wherein in particular coal, semi-coke/char, molecular hydrogen, gas mixtures containing molecular hydrogen, carbon monoxide and gas mixtures containing carbon monoxide, for example reformed gas, were found to be suitable. As reducing agent, a gas mixture containing CO/H$_2$, preferably a gas mixture of 60 to 80 vol-% CO and 20 to 40 vol-% H$_2$ preferably is used in combination with char.

Subsequent to the heat generator 9, the suspension is delivered by the gas stream into a cyclone 14 downstream of the fluidized bed reactor 13, in which cyclone the solids are separated from the gas. Thereupon, the separated solids are recirculated through the recycling chute 15 into the heat generator 9, whereas the waste gas containing CO, H$_2$, CO$_2$ and H$_2$O, which has a temperature of at least 850° C., is delivered via the gas duct 16 first into the suspension heat exchanger 7 of the second preheating stage and from there via the cyclone 8 and the gas duct 16' into the suspension heat exchanger 4 of the first preheating stage, in which it is cooled to about 500° C. Via the gas duct 16", the waste gas separated in the cyclone 5 downstream of the suspension heat exchanger 4 first is passed through a waste heat boiler 17a, in which the waste gas is cooled to approximately 200° C. by generating steam (about 4 bar), before it is liberated from dust and water in an apparatus consisting of cylone 17b (Multiclone) and Venturi scrubber 17c and cooled further to about 30° C. Subsequently, carbon dioxide is removed from the waste gas in a CO$_2$ absorber 18, and the gas mixture thus cleaned is heated to about 400° C. in a gas heater 19, before it is introduced as fluidizing gas via conduit 11 into the heat generator 9, the fluidized bed reactor 13 and a heat exchanger 21 designed as flash cooler (cf. WO 2004/056462 A1).

The cooling medium is introduced into the lower part of the cylindrical reactor of the flash cooler 21. Part of the cooling medium is charged into the flash cooler via a central nozzle, the rest serves for fluidizing the annular fluidized bed in the lower part of the reactor. The gas velocities preferably are adjusted such that in the central nozzle Particle Froude Numbers between 1 and 100 prevail, that in the annular fluidized bed Particle Froude Numbers between 0.02 and 2 prevail, and that in the reactor space above the central nozzle and the annular fluidized bed Particle Froude Numbers between 0.3 and 30 prevail. The Particle Froude Number is defined as:

$$Fr_p = \frac{u}{\sqrt{\frac{(\rho_s - \rho_f)}{\rho_f} * d_p * g}}$$

with
u=effective velocity of the gas flow in m/s
$\rho_s$=density of the solid particles in kg/m$^3$
$\rho_f$=effective density of the fluidizing gas in kg/m$^3$
$d_p$=mean diameter in m of the particles of the reactor inventory present during operation of the reactor (or of the particles formed)
g=gravitational constant in m/s$^2$.

The medium to be cooled is charged into the lower part of the flash cooler 21, preferably shortly above the annular fluidized bed. In the annular fluidized bed the fine-grained medium to be cooled is fluidized above the loosening point. As soon as the medium to be cooled flows over the edge of the central nozzle, it is entrained by the cooling medium entering there, mixed with the same and delivered to the top.

From the fluidized bed reactor 13 a mixture of reduced ore and char with a temperature of about 950° C. is withdrawn continuously via a preferably pneumatic solids conduit 20 and supplied to the lower region of the flash cooler 21. In the flash cooler 21, the solids mixture is mixed with the recirculation gas preheated to about 400° C. and delivered to the top with a high speed, wherein the recirculation gas cools the solids mixture to about 750° C. and itself is heated by the solids mixture to about 750° C.

In the upper region of the flash cooler 21, the suspension of solids mixture and recirculation gas is supplied through a discharge conduit 22 to a cyclone 23 which separates the solids mixture from the recirculation gas. Via a recycling duct 24, the separated recirculation gas with a temperature of about 750° C. is supplied to the central nozzle of the fluidized bed reactor 13 executed as an annular fluidized bed, where its thermal energy is available for the reduction of the granular iron ore.

The separated solids mixture with a temperature of about 750° C. is supplied to the discharge system via a solids chute 25. This system substantially consists of the buffer hopper 26, which is connected with a sending vessel 27 via a downcomer 25'. The pressure of e.g. 4 bar existing in the plant is decreased via a connected riser 25". The reduced mixture (reduced ore as well as char consisting of coal ash and residual carbon) lifted to the top is delivered from an overflow hopper 28 via an inclined chute 25"'' into the distribution vessel 29 and from there charged to a magnetic separator 30 (cf. WO 2008/142197 A1), in which the reduced ore is separated as magnetic fraction from a non-magnetic char fraction which substantially comprises ash and carbon, below the Curie temperature of the iron (768° C.) at 650° C. to 750° C., before the magnetic fraction is charged into a smelting reduction furnace 31. In FIG. 1, the preferred submerged arc furnace (SAF) is shown. Smelting reduction can, however, also take place in a blast furnace or in bath smelting processes, such as AusIron (cf FIG. 2) or Hismelt.

Figure 2:
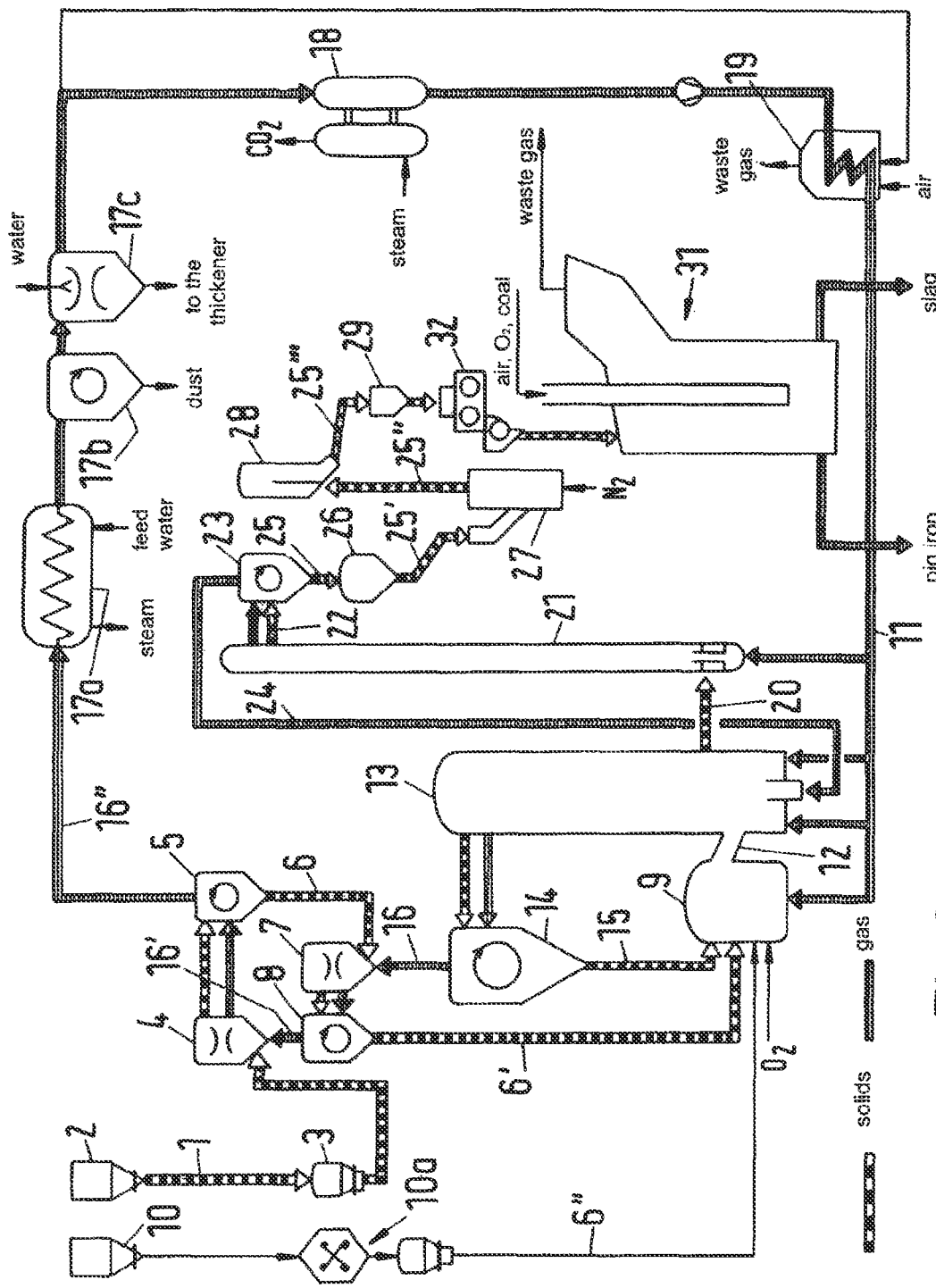
FIG. 2 shows a process diagram of a process and a plant in accordance with a further preferred embodiment of the present invention, FIG. 3 schematically shows a flow diagram of the process of the invention with various procedures.

In the smelting reduction furnace 31 operated at about 1450-1600° C., hot metal with more than 94 wt-% of metallic iron is produced. The waste gas from the submerged arc furnace 31 contains more than 90 vol-% CO and is burnt after dedusting in an afterburning chamber or preferably in the gas heater 19 for heating the recirculation gas. The waste gas from the AusIron furnace of FIG. 2 is almost completely burnt in the same, cooled in a waste heat boiler, and the steam generated thereby is used for the $CO_2$ absorption of the described process and for generating electricity.

The present invention has substantially been described with reference to reduced ore as intermediate product for the production of hot metal. However, it is generally applicable to processes and plants for producing metallized intermediates during the recovery of hot metal, in which a separation of non-metallic fractions by hot magnetic separation is advantageous not only for the purpose of saving energy during smelting, but e.g. also for removing impurities. Thus, the present invention can also be used for example in the production of titanium slag from ilmenite, as it is described in DE 10 2004 053 676 A1 of the applicant.

A separation of non-metallic fractions by hot magnetic separation can also be advantageous when the reduced ore should be hot-briquetted or hot-compacted, before it is further processed in a smelting reduction unit.

The present invention provides for an energy-efficient recovery of hot metal from iron ore by a combination of pre-reduction of the raw materials ("Circofer" process) and subsequent smelting reduction (in particular in a submerged arc furnace, but also e.g. in the "AusIron" process), wherein the pre-reduced material as intermediate product is cooled with a preheated process gas before the hot magnetic separation. The recovered energy can again be supplied to the pre-reduction by the process gas, whereby it is sufficient to heat the entire process gas to a temperature of about 400° C., which lies below the temperature of the temperature range critical for "metal dusting". Due to the present invention, less expensive plant materials on the one hand can be used for the gas heater and on the other hand energy losses on cooling the intermediate products can be minimized.

The present invention also provides for an efficient recovery of hot metal in smelting reduction processes which employ carbon as main energy carrier for smelting (e.g. blast furnace, AusIron or HIsmelt) and in which a hot magnetic separation is not expedient due to the composition of the non-metallic char. This applies e.g. when high-grade carbon carriers with a small ash content are used in the reduction. In this case, as it is shown in FIG. 2, the flash cooler 21 is used, in order to largely heat up the recirculation gas from 400° C. for the reduction and to bring the reduced mixture to the height required for smelting reduction 31, hot briquetting or hot compaction 32 or for a hot conveying system. The energy from the solids cooling in turn is supplied to the reduction, and the gas heater can again be operated in the temperature range below the "metal dusting". Except for the omission of the hot magnetic separator and the representation of the hot compaction 32 also possible in the embodiment of FIG. 1, the procedure corresponds to the embodiment as shown in FIG. 1. In addition, a smelting reduction furnace 31 based on the combustion of coal according to the AusIron process is shown instead of the submerged arc furnace. Moreover, reference is made to the above description of FIG. 1.

FIG. 3 schematically shows the variant with direct supply of the reduced mixture from the discharge system to the smelting unit without hot magnetic separation as well as variants with and without compaction of the reduced ore withdrawn from the discharge system or the hot magnetic separation.

By the measures considered in the present invention:
direct reduction at temperatures below the melting temperature
separation of by-products before smelting, and
hot charging of the reduced ore into the smelting unit
considerable savings of energy are achieved during smelting reduction.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE NUMERALS 1 solids supply chute
2 storage bin for granular iron ore
3 mixing tank
4 heat exchanger of the first preheating stage
5 cyclone of the first preheating stage
6, 6', 6" solids chute
7 heat exchanger of the second preheating stage
8 cyclone of the second preheating stage
9 heat generator
10 storage bin for coal
10a grinding and drying apparatus
11 gas duct for recirculation gas 12 connecting passage
13 fluidized bed reactor
14 cyclone of the fluidized bed reactor
15 solids return chute
16, 16', 16" gas duct
17a waste heat boiler
17b cyclone
17c scrubber
18 $CO_2$ absorber
19 gas heater
20 solids conduit
21 flash cooler (heat exchanger apparatus)
22 discharge chute
23 cyclone of the flash cooler
24 recycling duct
25, 25', 25", 25'" solids chute
26 buffer hopper
27 sending vessel
28 overflow hopper
29 distribution hopper
30 hot magnetic separator
31 smelting reduction furnace
32 hot compaction unit

The invention claimed is:

1. A process for producing hot metal, comprising:
partially reducing granular raw materials containing iron oxide with a carbonaceous reducing agent in a fluidized bed reactor at a temperature of at least 850° C. so as to obtain a reduced mixture;
preheating a process gas to a temperature between 300° C. and 450° C.;
introducing the preheated process gas into a heat exchanger apparatus;
cooling the reduced mixture to between 600° C. and 800° C. in the heat exchanger apparatus using the preheated process gas as a cooling medium; and then
supplying the reduced mixture to a smelting reduction unit via a discharge system.

2. The process according to claim 1, wherein the preheated process gas is a recirculation gas withdrawn from the fluidized bed reactor.

3. The process according to claim 1, wherein the preheated process gas contains at least one of carbon monoxide (CO) and elementary hydrogen ($H_2$).

4. The process according to claim 1, wherein the preheated process gas is heated to between 600° C. and 800° C. by the reduced mixture in the heat exchanger apparatus.

5. The process according to claim 1, further comprising separating the reduced mixture from the preheated process gas subsequent to the preheated process gas being heated in the heat exchanger apparatus and then supplying the preheated process gas that has been heated in the heat exchanger apparatus to the fluidized bed reactor as a fluidizing or reduction gas.

6. The process according to claim 1, further comprising:
supplying the reduced mixture, including reduced ore and non-magnetic substances, to a magnetic separator subsequent to each of the heat exchanger apparatus and the discharge system and;
separating, in the magnetic separator, the non-magnetic substances.

7. The process according to claim 6, further comprising controlling a flow temperature of the he magnetic separator via a temperature of the preheated process gas.

8. The process according to claim 6, further comprising supplying at least one of the reduced mixture after the discharge system and the reduced ore after the magnetic separator to a briquetting or compaction unit.

9. The process according to claim 1, further comprising delivering, in the heat exchanger apparatus, the reduced mixture to a predetermined height of the discharge system or another subsequent apparatus.

10. The process according to claim 1, wherein, in the discharge system, a plant pressure existing in the fluidized bed reactor and in the heat exchanger apparatus is decreased completely via a riser and an overflow hopper.

11. A plant for producing hot metal, comprising:
charging devices for iron ore and reducing agent;
a fluidized bed reactor configured to partially reduce the iron ore and provide a reduced mixture;
a smelting reduction unit configured to produce hot metal; and
a heat exchanger apparatus connected between the fluidized bed reactor and the smelting reduction unit and configured to receive the reduced mixture from the fluidized bed reactor, the heat exchanger apparatus being connected with a duct for preheated process gas and with the smelting unit via a discharge system, the heat exchanger apparatus being a flash cooler.

12. The plant according to claim 11, wherein the flash cooler includes an annular fluidized bed.

13. The plant according to claim 11, further comprising:
a cyclone disposed subsequent to the heat exchanger apparatus and configured to separate iron-containing solids from the process gas;
a recycling duct which leads out of the cyclone into the fluidized bed reactor; and
a solids chute which leads out of the cyclone to the discharge system.

14. The plant according to claim 11, further comprising a magnetic separator disposed subsequent to the discharge system.

15. The plant according to claim 14, further comprising a briquetting or compaction unit disposed subsequent to the discharge system or the magnetic separator.

* * * * *